(12) United States Patent
Nardella et al.

(10) Patent No.: US 11,474,494 B2
(45) Date of Patent: Oct. 18, 2022

(54) METHOD FOR SIMULATING AN N1 AND N2 SPEED VIBRATION COMPOSITE INPUT FOR DEVELOPMENT AND/OR MODEL BASED TESTING OF ENGINE CONTROL HARDWARE AND EMBEDDED SOFTWARE

(71) Applicant: Hamilton Sundstrand Corporation, Charlotte, NC (US)

(72) Inventors: John J. Nardella, Avon, CT (US); James Saloio, Ludlow, MA (US); John M. O'Neil, Litchfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 867 days.

(21) Appl. No.: 16/362,075

(22) Filed: Mar. 22, 2019

(65) Prior Publication Data

US 2020/0301392 A1    Sep. 24, 2020

(51) Int. Cl.
*G05B 19/406* (2006.01)
*B64D 27/10* (2006.01)
(Continued)

(52) U.S. Cl.
CPC .......... *G05B 19/406* (2013.01); *B64D 27/10* (2013.01); *B64D 31/00* (2013.01); *F02C 9/00* (2013.01);
(Continued)

(58) Field of Classification Search
CPC ...... G05B 19/406; G05B 19/00; G05B 19/02; G05B 19/042; G05B 19/0421;
(Continued)

(56) References Cited

U.S. PATENT DOCUMENTS 3,713,427 A    1/1973  Adler
5,565,618 A *  10/1996 Hu .......................... G01M 7/022
                                                        73/662
(Continued)

FOREIGN PATENT DOCUMENTS

CA    2810014 C  *  5/2020  .............. F02B 63/04
EP    0322342 A2    12/1988
EP    2674741 A1    12/2013

OTHER PUBLICATIONS

Extended European Search Report dated May 29, 2020, received for corresponding European Application No. 19212093.9, 10 pages.
(Continued)

*Primary Examiner* — Daniel R Miller
*Assistant Examiner* — Eric Sebastian Von Wald
(74) *Attorney, Agent, or Firm* — Kinney & Lange, P.A.

(57) ABSTRACT

A system and method for generating input signals for an electronic engine control module includes a first waveform generator that is configured to generate a simulated first speed signal that is representative of a first speed and a vibration modulating signal that is representative of the first speed, a second waveform generator that is synchronized with the first waveform generator is configured to receive the vibration modulating signal and to generate a simulated second speed signal that is representative of a second speed and a simulated composite vibration voltage signal, and a voltage-to-charge converter that is configured to receive the simulated composite vibration voltage signal from the second waveform generator and to generate a simulated composite vibration charge signal that simulates a speed/vibration composite signal from an accelerometer.

18 Claims, 3 Drawing Sheets

(51) Int. Cl.
  *B64D 31/00* (2006.01)
  *F02C 9/00* (2006.01)
  *G05F 1/46* (2006.01)
(52) U.S. Cl.
  CPC ............ *G05F 1/46* (2013.01); *F05D 2260/83* (2013.01); *G05B 2219/37416* (2013.01)
(58) Field of Classification Search
  CPC .. G05B 19/0423; G05B 19/045; G05B 19/06; G05B 19/07; G05B 19/102; G05B 19/21; G05B 19/33; G05B 19/4063; G05B 2219/37416; G05B 2219/37434; G05B 2219/37432; G05B 2219/37441; B64D 27/10; B64D 27/00; B64D 27/12; B64D 27/14; B64D 31/00; B64D 31/06; B64D 31/12; B64D 31/14; F02C 9/00; G05F 1/46; G05F 1/10; G05F 1/12; G05F 1/153; G05F 1/22; G05F 1/247; G05F 1/625; G05F 1/462; F05D 2260/83; F05D 2260/903; H03L 7/24; H03L 7/101; H03L 7/103; H03L 7/146; H04L 1/242; B60R 2021/01286
  See application file for complete search history.

(56) References Cited

U.S. PATENT DOCUMENTS

| | | | |
|---|---|---|---|
| 5,965,816 A * | 10/1999 | Hu | G01M 7/022 |
| | | | 702/56 |
| 6,343,251 B1 * | 1/2002 | Herron | G07C 3/00 |
| | | | 701/100 |
| 9,080,925 B2 | 7/2015 | Schwab et al. | |
| 2010/0324799 A1 | 12/2010 | Davison | |
| 2013/0199204 A1 * | 8/2013 | Camhi | G05B 23/0221 |
| | | | 60/779 |
| 2018/0372016 A1 | 12/2018 | Calhoun | |

OTHER PUBLICATIONS

Pico Electronics, Inc., Ultra Miniature Transformers, S Series Thru Hole, 6 pages, Pelham, NY.

European Office Action dated Jun. 24, 2021, received for corresponding European Application No. 19212093.9, 10 pages.

* cited by examiner

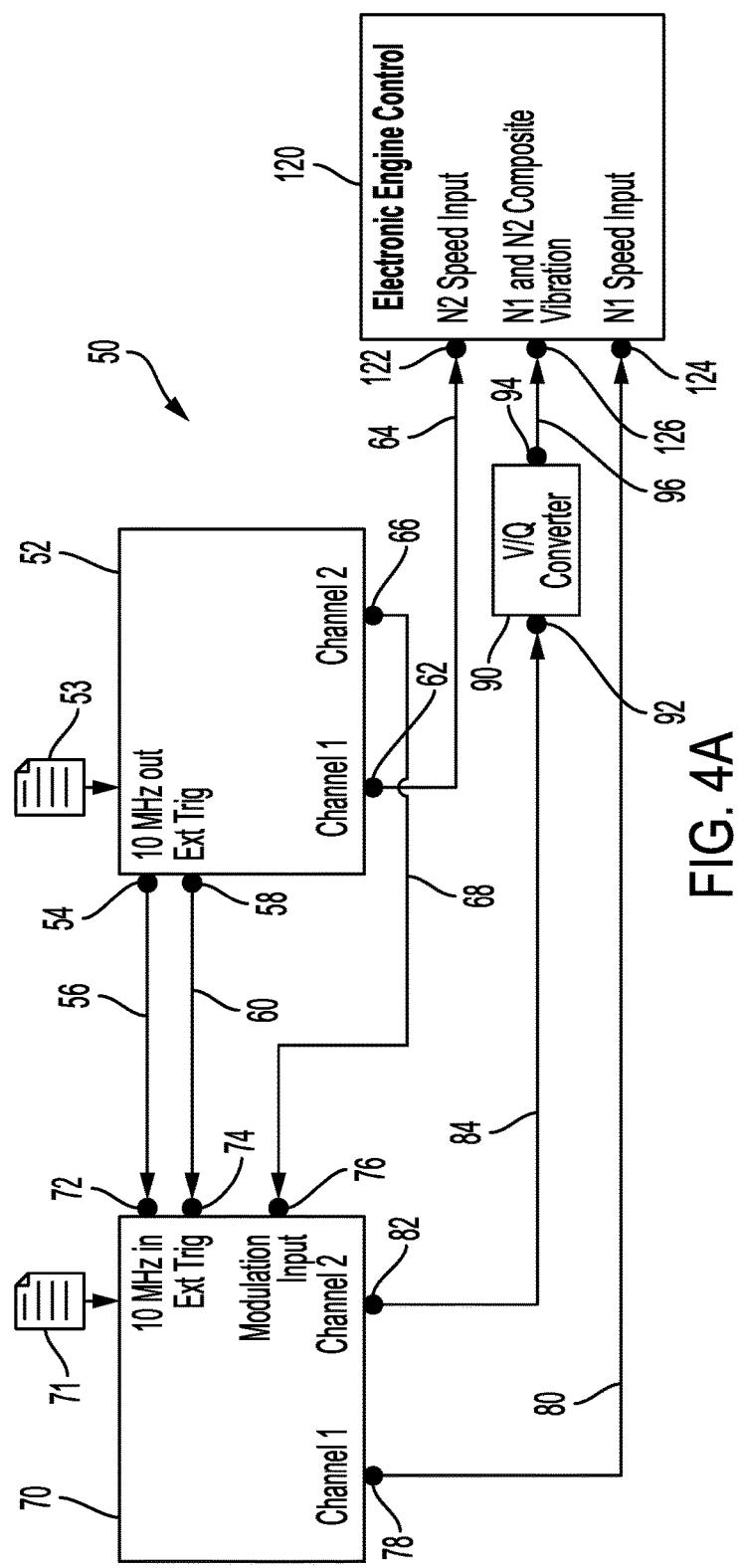
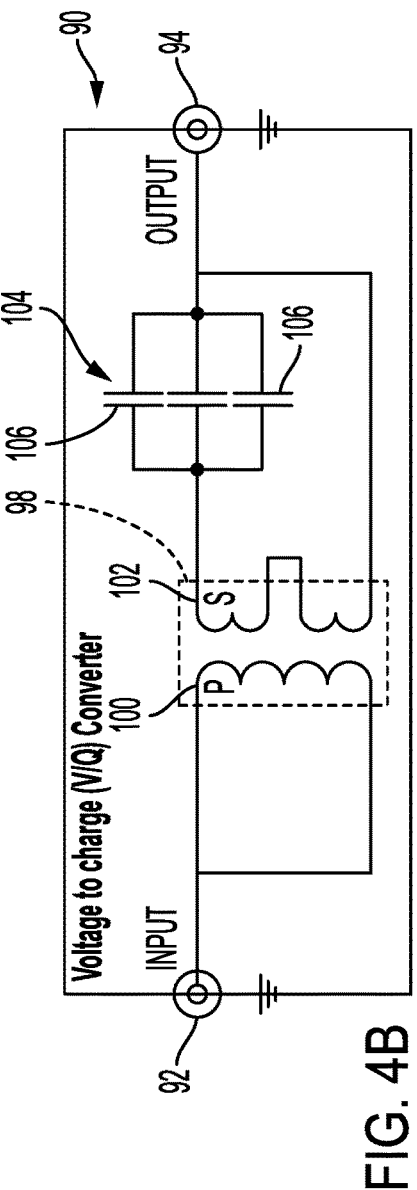
FIG. 4A
FIG. 4B

METHOD FOR SIMULATING AN N1 AND N2 SPEED VIBRATION COMPOSITE INPUT FOR DEVELOPMENT AND/OR MODEL BASED TESTING OF ENGINE CONTROL HARDWARE AND EMBEDDED SOFTWARE

BACKGROUND

Modern aircraft engines and associated systems operate at increasingly higher performance and efficiencies, placing greater demands on electronic engine control (EEC) systems. Accordingly, the developing and/or testing of modern EEC systems is important to help optimize this performance, but a gas turbine engine is typically required to generate the various speed and vibration signals for system development and verification testing, which can be wasteful of resources. There is a need for simulating the speed and vibration signals from the detectors on a gas turbine engine for use in efficiently developing and/or testing these modern EEC systems.

SUMMARY

A system for generating input signals for an electronic engine control module includes a first waveform generator that is configured to generate a simulated first speed signal that is representative of a first speed and a vibration modulating signal that is representative of the first speed, a second waveform generator that is synchronized with the first waveform generator and is configured to generate a simulated second speed signal that is representative of a second speed and a vibration modulating signal that is representative of the second speed and a simulated composite vibration voltage signal comprised of the vibration modulating signal that is representative of the first speed received from the first waveform generator and the vibration modulating signal that is representative of the second speed, and a voltage-to-charge converter that is configured to receive the simulated composite vibration voltage signal from the second waveform generator and to generate a simulated composite vibration charge signal that simulates a vibration composite signal from an accelerometer based on the first and second speeds.

A method of generating input signals for an electronic engine control module by using a first and second waveform generator and a voltage-to-charge converter includes: generating, by the first waveform generator, a simulated first speed signal that is representative of a first speed and a vibration modulating signal that is representative of the first speed; inputting, from the first waveform generator to the second waveform generator that is synchronized with the first waveform generator, the vibration modulating signal; generating, by the second waveform generator, a simulated second signal that is representative of a second speed and a simulated composite vibration voltage signal that is representative of the second speed and the vibration modulating signal; and generating, by the voltage-to-charge converter, a simulated composite vibration charge signal that simulates a vibration composite signal from an accelerometer based on the first and second speeds. The simulated composite vibration charge signal is representative of the simulated composite vibration voltage signal.

BRIEF DESCRIPTION OF THE DRAWINGS

FIG. 4A is a schematic block diagram showing an electronic engine control (EEC) vibration test simulator.

FIG. 4B is a schematic circuit diagram showing the detail of a voltage-to-charge (V/C) converter.

DETAILED DESCRIPTION

Figure 1:
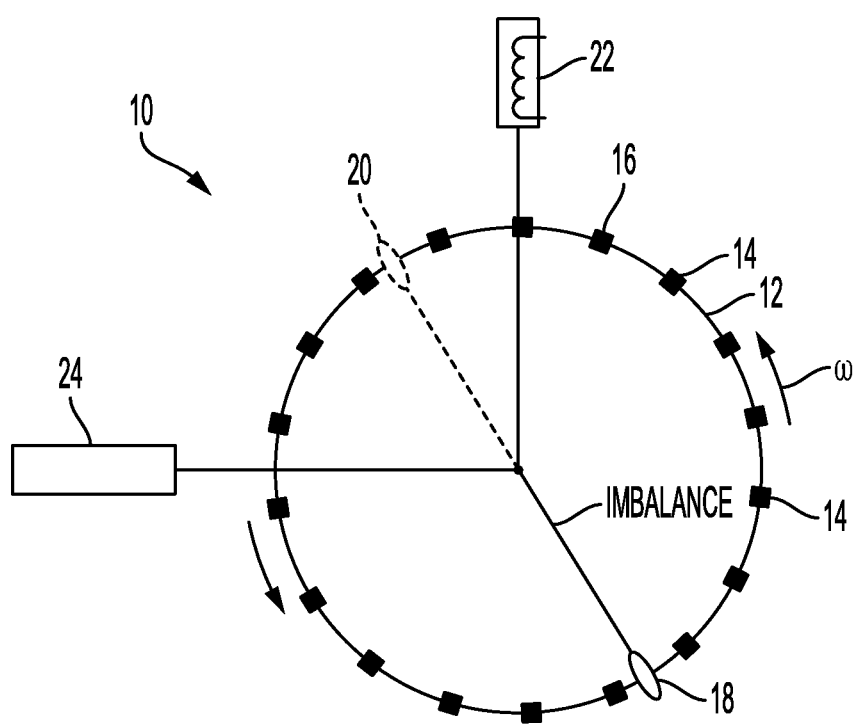
FIG. 1 is a schematic diagram showing a phonic wheel and associated sensors on an engine shaft.

Modern electronic engine control (EEC) systems, such as those used on gas turbine engines, help improve the performance and/or efficiency of gas turbine engines under various loads and during various phases of operation. EEC systems monitor and respond to various parameters that are sensed by various sensors. For example, the first spool speed (or fan speed) can be represented as an N1 speed, and the core compressor spool speed can be represented as an N2 speed. Independent speed probes can be used to sense the N1 and N2 speeds. An electromagnetic sensor that detects the passing of teeth on a phonic wheel on a shaft is an example of a speed probe. The N1 and N2 speeds are each represented as a voltage signal having the form of a cyclical (i.e., time-varying) waveform that are input to the EEC system. In addition to the speed probes, an accelerometer can used to detect the vibration of a gas turbine engine. An accelerometer can use a piezoelectric crystal to produce a cyclical (i.e., time-varying) waveform that represents an electrical charge as a function of acceleration, with this signal also being input to the EEC system. The vibration signal from an accelerometer is typically a composite signal that is related to the rotational speeds of the various shafts within the gas turbine engine, which is related to the N1 and N2 speed signals described above. Accordingly, the vibration signal can be representative of an N1/N2 composite sum signal.

Despite the precision with which modern gas turbine engines are manufactured, some amount of vibration exists during their operation as a result of the rotations of the various shafts and associated components. It can be important to monitor vibration so that the EEC system can control the gas turbine engine to reduce the vibration during operation of the gas turbine engine as well as support on-condition maintenance actions. This can be beneficial for prolonging the life of the gas turbine engine and/or reducing maintenance requirements, while also reducing the fatigue on engine support components. Moreover, controlling the operating performance of a gas turbine engine can result in less noise that is radiated into the aircraft and/or the surrounding environment. Accordingly, it can be important to optimize the performance of EEC systems, which can include electronic hardware systems and embedded software. In developing and/or testing an EEC system, a gas turbine engine can be operated to produce the N1 and N2 speed signals and the composite vibration signal. This requires using an operational gas turbine engine which requires burning fuel, and the associated time, cost, and maintenance requirements.

The present disclosure is directed to a system and method for simulating N1 and N2 speed signals and an N1/N2 vibration composite signal that can be provided as inputs to an EEC system for use in developing and testing an EEC system, which can include the model-based testing of EEC electronic hardware and/or embedded software.

Figure 2:
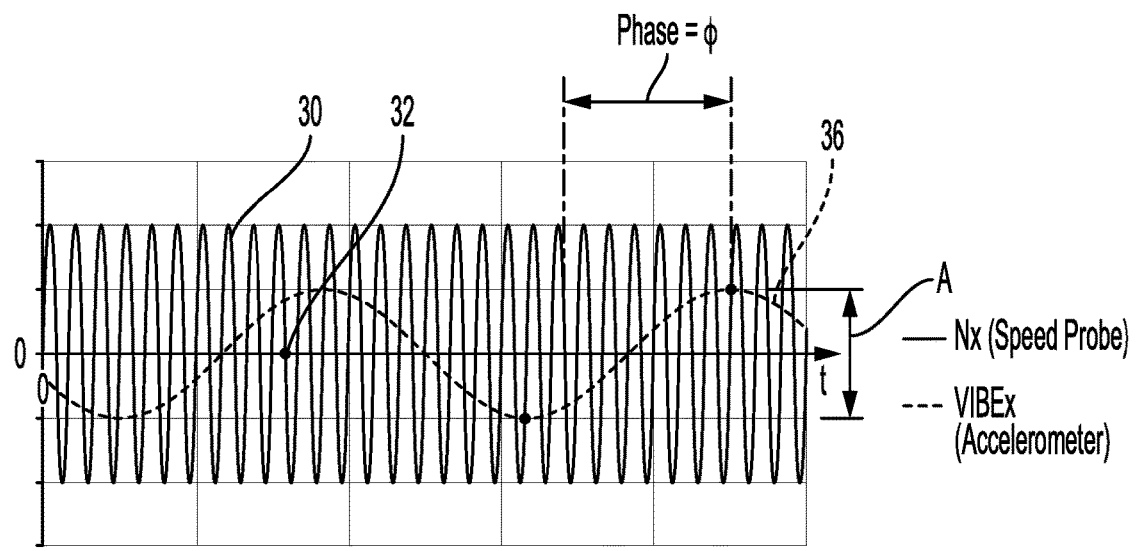
FIG. 2 is a graph showing representative speed and vibration waveforms from the sensors shown in FIG. 1.

FIG. 1 is a schematic diagram showing a phonic wheel and sensors used to detect speed and vibration of a shaft on a gas turbine engine. FIG. 2 is a graph showing representative speed and vibration waveforms from the sensors shown in FIG. 1. Shown in FIGS. 1-2 are engine sensor system 10, phonic wheel 12, teeth 14, index tooth 16, heavy spot 18, light spot 20, speed probe 22, accelerometer 24, speed signal 30, tooth zero crossing 32, and vibration signal 36. Also shown are angular rotational speed ω, vibration phase φ, and vibration amplitude A. Phonic wheel 12 rotates with a shaft (not shown) at angular rotational speed w. Non-limiting examples of a rotating shaft are a first spool shaft and a compressor core spool shaft. Phonic wheel 12 includes a number of teeth 14 that are spaced about the outer periphery. As phonic wheel 12 rotates, teeth 14 pass in the vicinity of speed probe 22 thereby inducing an electrical response corresponding to the rotation of phonic wheel 12. Phonic wheel 12 also includes index tooth 16 which can be used to identify the radial position of phonic wheel 12 relative to a datum (not shown). In the illustrated embodiment, speed probe 22 is an inductive coil and teeth 14 are made of a ferromagnetic material that induces a voltage in speed probe 22 with the passing of each tooth 14, thereby producing a waveform of speed signal 30 as shown in FIG. 2. Speed signal 30 is represented as a time-varying voltage over time. Each tooth 14 passes speed probe 22, thereby creating a tooth zero crossing 32 as shown. In a typical embodiment, speed signal 30 is provided as an input to an EEC system (not shown in FIGS. 1-2). Phonic wheel 12 and speed sensor 22 depict an exemplary system for measuring the speed of a shaft, which can include a first spool shaft (i.e., the N1 speed), and a compressor core spool shaft (i.e., the N2 speed). Accordingly, in an exemplary embodiment, engine sensor system 10 on a particular gas turbine engine (not shown) can include two phonic wheels 12, each having an associated speed sensor 22. Accordingly, it is to be appreciated that two speed signals 30 will be used to represent the N1 speed and N2 speed, respectively, in a typical embodiment.

As described above, a gas turbine engine can be prone to vibration during its operation (i.e., rotation of shafts), because even the most minute mass imbalances can result in rotational vibration at operating speeds. A mass imbalance in a particular shaft can be modeled as heavy spot 18 and light spot 20, as shown in FIG. 1. The rotational vibration of a gas turbine engine can be detected by an accelerometer 24 that is included in engine sensor system 10. Accelerometer 24 produces vibration signal 36, which is represented as a time-varying electrical signal having vibrational amplitude A and vibrational phase φ. In the illustrated embodiment, vibration signal 36 is produced by a piezoelectric accelerometer and has units of electrical charge. Vibration signal 36 can be provided as an input to an EEC system. An EEC system can also be referred to as an EEC module. It is to be appreciated that vibrational amplitude A and vibrational phase φ can vary with the magnitude and radial positions of heavy spot 18 and/or light spot 20. It is also to be appreciated that a gas turbine engine includes a first spool shaft (i.e., N1 speed), and a compressor core spool shaft (i.e., N2 speed), as described above in regard to FIG. 1, and that speed signal 30 represents a single speed signal (i.e., $N_X$ speed signal). Accordingly, in some embodiments, vibration signal 36 will contain vibration components of both the N1 and the N2 turbine speeds.

Figure 3:
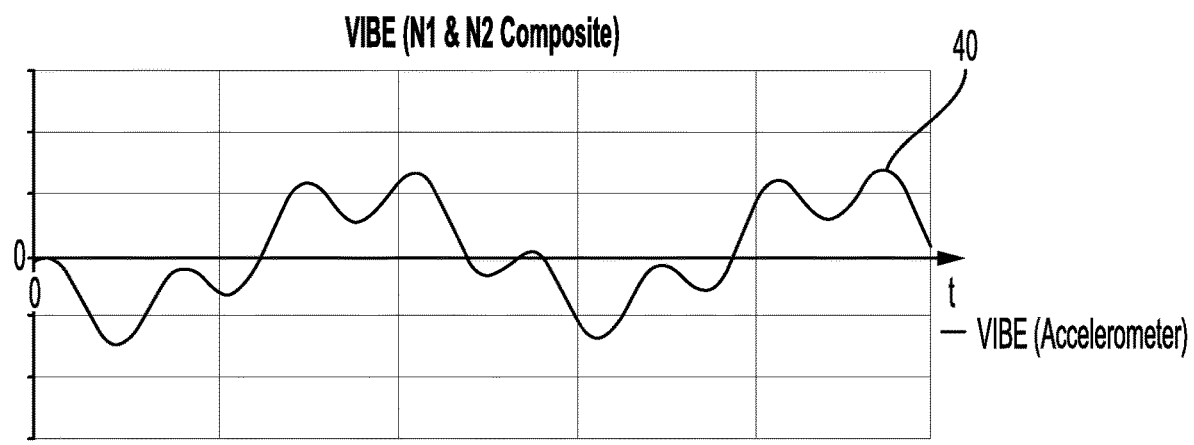
FIG. 3 is a graph showing a representative N1 and N2 composite vibration waveform from a sensor shown in FIG. 1

FIG. 3 is a graph showing a representative N1 and N2 composite vibration waveform from accelerometer 24 shown in FIG. 1. Shown in FIG. 3 is N1 and N2 composite vibration waveform 40, a time-varying electrical charge signal having frequency components of the N1 and N2 speeds. A gas turbine engine having two rotating shafts, each having a corresponding respective N1 and N2 speed, will be based on the rotational speeds of both shafts. Accordingly, accelerometer 24 detects vibration and produces an electrical output that is representative of the N1 and N2 speeds, as depicted by composite vibration waveform 40.

FIG. 4A is a schematic block diagram showing an electronic engine control (EEC) signal simulator. Shown in FIG. 4A are signal simulator 50, first waveform generator 52, first data file 53, synchronizing signal output terminal 54, synchronizing signal 56, trigger signal output terminal 58, trigger signal 60, first waveform generator channel 1 output terminal 62, simulated N2 speed signal 64, first waveform generator channel 2 output terminal 66, vibration modulating signal 68, second waveform generator 70, second data file 71, synchronizing signal input terminal 72, trigger signal input terminal 74, modulation signal input terminal 76, second waveform generator channel 1 output terminal 78, simulated N1 speed signal 80, second waveform generator channel 2 output terminal 82, simulated composite vibration voltage signal 84, voltage to charge (V/C) converter 90, V/C converter input terminal 92, V/C converter output terminal 94, simulated composite vibration charge signal 96, electronic engine control (EEC) module 120, EEC module N2 speed input terminal 122, EEC module N1 speed input terminal 124, and EEC module vibration signal input terminal 126. In the illustrated embodiment, first waveform generator 52 is an arbitrary waveform generator that produces waveforms based on the reading of first data file 53. In a particular embodiment, first data file 53 can be a comma-separated values (CSV) data file that programs waveform parameters. It is to be appreciated that in the electrical art, an "arbitrary waveform generator" (AWG) is a piece of electronic test equipment that can be used to synthesize a waveform by inputting various parameters that describe the desired waveform. In the illustrated embodiment, first data file 53 contains information representative of an N2 speed signal and the corresponding N2 vibration signal component. First waveform generator 52 produces synchronizing signal 56 at synchronizing signal output terminal 54 for use in synchronizing second waveform generator 70. In the illustrated embodiment, synchronizing signal 56 is a 10 MHz signal. First waveform generator 52 also produces trigger signal 60 at trigger signal output terminal 58 for use in triggering second waveform generator 70. Based on the data contained in first data file 53, first waveform generator 52 produces simulated N2 speed signal 64 at first waveform generator channel 1 output terminal 62, which can be provided as an input to EEC module 120. Simulated N2 speed signal 64 is a time-varying voltage signal that simulates the output of a speed probe (e.g., speed probe 22 as described above in regard to FIG. 1). First waveform generator 52 also produces vibration modulating signal 68 at first waveform generator channel 2 output terminal 66, which will be used by second waveform generator 70. Vibration modulating signal 68 is based on the N2 speed vibration component (i.e., representative of simulated N2 speed signal 64).

In the illustrated embodiment, second waveform generator 70 is an arbitrary waveform generator that produces waveforms based on the reading of second data file 71. In a particular embodiment, second data file 71 can be a comma-separated values (CSV) data file that programs waveform parameters. In the illustrated embodiment, second data file 71 contains information representative of an N1 speed signal and the corresponding N1 vibration signal component. Second waveform generator 70 receives synchronizing signal 56 at synchronizing signal input terminal 72, and trigger signal 60 at trigger signal input terminal 74, thereby synchronizing the operation of second waveform generator 70 to that of first waveform generator 52. Based on the data contained in second data file 71, second waveform generator 70 produces simulated N1 speed signal 80 at second waveform generator channel 1 output terminal 78, which can be provided as an input to EEC module 120. Simulated N1 speed signal 80 is a time-varying voltage signal that simulates the output of a speed probe (e.g., speed probe 22, as described above in regard to FIG. 1). Second waveform generator 70 also produces simulated composite vibration voltage signal 84 at second waveform generator channel 2 output terminal 82, by modulating and/or summing the simulated N1 vibration signal component with the simulated N2 vibration signal component. Accordingly, simulated composite vibration voltage signal 84 contains vibration components of both the N1 and the N2 turbine speeds. Simulated composite vibration voltage signal 84 can also be referred to as a simulated first and second composite vibration voltage signal because it contains vibration components of both the N1 and N2 speeds (i.e., the first and second speeds). In the illustrated embodiment, simulated composite vibration voltage signal 84 is a time-varying voltage signal. As described above in regard to FIGS. 1-2, an EEC system receives a time-varying electrical charge signal from accelerometer 24. Therefore, simulated composite vibration voltage signal 84 cannot be applied directly to EEC module 120. In the illustrated embodiment, V/C converter 90 converts simulated composite vibration voltage signal 84 (i.e., a time-varying voltage signal) received at V/C converter input terminal 92 into simulated composite vibration charge signal 96 (i.e., a time-varying electrical charge signal) at V/C converter output terminal 94. Accordingly, signal simulator 50 simulates speed probe(s) 22 and vibration sensor 24 on a gas turbine engine (e.g., engine sensor system 10) for by providing simulated signals to EEC module 120. EEC module 120 receives simulated N2 speed signal 64 at EEC module N2 speed input terminal 122, simulated N1 speed signal 80 at EEC module N1 speed input terminal 124, and simulated composite vibration charge signal 96 at EEC module vibration signal input terminal 126. In the illustrated embodiment, simulated N2 speed signal 64 can support a frequency range corresponding to a shaft rotational velocity from about 1-400 revolutions per second, and simulated N1 speed signal 80 can support a frequency range corresponding to a shaft rotational velocity from about 1-200 revolutions per second. Shaft rotational velocity can also be referred to as shaft rotational speed, or shaft speed. Shaft rotational velocity can be referred to as a "once per revolution" or "once per rev" frequency. It is to be appreciated that in a particular embodiment, a speed signal (e.g., N2 speed, N1 speed) are typically a product of the shaft rotational velocity and the number of teeth on the associated phonic wheel. For example, in simulating an N2 speed signal for an embodiment where the associated phonic wheel has eighteen teeth (e.g., as shown in FIG. 1), a simulated shaft rotational velocity of 100 revolutions per second (i.e., the once per rev frequency is 100 Hz) would result in simulated N2 speed signal 64 being 1,800 Hz.

FIG. 4B is a schematic circuit diagram showing the detail of V/C converter 90. Shown in FIG. 4B are V/C converter 90, V/C converter input terminal 92, V/C converter output terminal 94, transformer 98, primary winding 100, secondary winding 102, capacitor 104, individual capacitors 106. V/C converter 90 includes transformer 98 having primary winding 100 and secondary winding 102. When a time-varying voltage is applied to primary winding 100, transformer 98 induces a time-varying voltage at secondary winding 102 by the mutual inductive coupling between primary winding 100 and secondary winding 102. In the illustrated embodiment, transformer 98 is a transformer having a primary-to-secondary turns ratio of 1:1. In some embodiments, transformer 98 can be a miniature or an ultra-miniature transformer. In other embodiments, transformer 98 can have a primary-to-secondary turns ratio between about 10:1 and 1:10. It is to be appreciated that in the transformer art, a turns ratio can be expressed as a ratio of the number of primary turns to the number of secondary terms, with each number in the ratio being at least 1.

Referring again to FIG. 4B, secondary winding 102 is series-connected to capacitor 104 with respect to ground. In the illustrated embodiment, capacitor 104 has a capacitance of about 3,000 pF, with three individual capacitors 106 being connected in parallel to form capacitor 104. In the illustrated embodiment, each individual capacitor 106 is a temperature-compensating ceramic capacitor having a rated capacitance value of 1,000 pF and a value tolerance of 1%. A temperature compensating ceramic capacitor can be referred to as a negative-positive 0 ppm/° C. capacitor, or as an "NP0" or "NPO" ceramic capacitor. In some embodiments, capacitor 104 can include any number of individual capacitors 106, either fewer than three or more than three. In some embodiments, capacitor 104 can be a single individual capacitor 106.

In a particular embodiment, the value of the capacitor 104 can be selected to match the specified nominal output capacitance of the accelerometer that is being simulated (e.g., accelerometer 24 as shown in FIG. 1). Accordingly, in some embodiments, capacitor 104 can have a capacitance value that ranges between about 1,000 and 20,000 pF to match the output capacitance of a particular accelerometer. In other embodiments, capacitor 104 can have a capacitance value that is less than 1,000 pF, or more than 20,000 pF. In yet other embodiments, the value tolerance on capacitor 104 and/or individual capacitors 106 can be less than 1% or more than 1%. In some embodiments, capacitor 104 and/or individual capacitors 106 can be capacitors having a type other than a temperature-compensating ceramic capacitor.

Discussion of Possible Embodiments

A system for generating input signals for an electronic engine control (EEC) module, the system comprising: a first waveform generator that is configured to generate: a simulated first speed signal that is representative of a first speed; and a vibration modulating signal that is representative of the first speed; a second waveform generator, synchronized with the first waveform generator, that is configured to receive the vibration modulating signal and to generate: a simulated second speed signal that is representative of a second speed; and a simulated composite vibration voltage signal; and a voltage-to-charge (V/Q) converter that is configured to receive the simulated composite vibration voltage signal from the second waveform generator and to generate a simulated composite vibration charge signal that simulates a speed/vibration composite signal from an accelerometer.

The system of the preceding paragraph can optionally include, additionally and/or alternatively, any one or more of the following features, configurations and/or additional components:

A further embodiment of the foregoing system, wherein the first waveform generator comprises a first arbitrary waveform generator that is configured to: read a first data file that is representative of a modeled first speed; generate the simulated first speed signal in response to the first data file; and generate the vibration modulating signal in response to the first data file; and the second waveform generator comprises a second arbitrary waveform generator that is configured to: read a second data file that is representative of a modeled second speed; generate the simulated second signal in response to the second data file; and generate the simulated composite vibration voltage signal in response to the second data file and the vibration modulating signal.

A further embodiment of the foregoing system, wherein the V/Q converter comprises: a transformer, including a primary winding and a secondary winding; and a capacitor, defining a capacitor input terminal and a capacitor output terminal; wherein: the transformer is configured to: receive the simulated composite vibration voltage signal at the primary winding; produce, by inductive coupling, an induced first and second composite vibration voltage signal at the secondary winding; and apply the induced first and second composite vibration voltage signal to the capacitor input terminal; and the capacitor is configured to: receive, at the capacitor input terminal, the induced first and second composite vibration voltage signal; and produce, by electrostatic coupling, the simulated composite vibration charge signal at the capacitor output terminal.

A further embodiment of the foregoing system, wherein the first waveform generator if further configured to: produce a synchronizing signal and a trigger signal; and input the synchronizing signal and the trigger signal to the second waveform generator, thereby synchronizing the second waveform generator with the first waveform generator.

A further embodiment of the foregoing system, wherein the first speed is representative of an N2 speed; and the second speed is representative of an N1 speed.

A further embodiment of the foregoing system, wherein the transformer has a primary-to-secondary turns ratio between 1:10 and 10:1.

A further embodiment of the foregoing system, wherein the transformer has a primary-to-secondary turns ratio of about 1:1.

A further embodiment of the foregoing system, wherein the transformer is miniature or an ultra-miniature transformer.

A further embodiment of the foregoing system, wherein the capacitor has a capacitance between 1,000 and 20,000 pF.

A further embodiment of the foregoing system, wherein the capacitor comprises three parallel-connected temperature-compensating ceramic capacitors, each having a capacitance of about 1,000 pF.

A further embodiment of the foregoing system, wherein the first data file is a first comma-separated values (CSV) data file; and the second data file is a second CSV file.

A further embodiment of the foregoing system, wherein the synchronizing signal is a 10 MHz synchronizing clock signal.

A further embodiment of the foregoing system, wherein the simulated N2 speed signal corresponds to a shaft rotational speed between 1-400 revolutions per second.

A further embodiment of the foregoing system, wherein the simulated N1 speed signal corresponds to a shaft rotational speed between 1-200 revolutions per second.

A further embodiment of the foregoing system, further comprising an EEC module for a gas turbine engine, configured to receive the simulated first speed signal, the simulated second speed signal, and the simulated composite vibration charge signal.

A method of generating input signals for an electronic engine control (EEC) module by using a first and second waveform generator and a voltage-to-charge (V/Q) converter, the method comprising: generating, by the first waveform generator: a simulated first speed signal that is representative of a first speed; and a vibration modulating signal that is representative of the first speed; inputting, from the first waveform generator to the second waveform generator, the vibration modulating signal; generating, by the second waveform generator: a simulated second signal that is representative of a second speed; and a simulated composite vibration voltage signal that is representative of the second speed and the vibration modulating signal; wherein the second waveform generator is synchronized with the first waveform generator; and generating, by the V/Q converter, a simulated composite vibration charge signal that simulates a speed/vibration composite signal from an accelerometer, wherein the simulated composite vibration charge signal is representative of the simulated composite vibration voltage signal.

The method of the preceding paragraph can optionally include, additionally and/or alternatively, any one or more of the following features, configurations and/or additional components:

A further embodiment of the foregoing method, wherein: the first waveform generator comprises a first arbitrary waveform generator that is configured to: read a first data file that is representative of a modeled first speed; generate the simulated first speed signal in response to the first data file; and generate the vibration modulating signal in response to the first data file; and the second waveform generator comprises a second arbitrary waveform generator that is configured to: read a second data file that is representative of a modeled second speed; generate the simulated second signal in response to the second data file; and generate the simulated composite vibration voltage signal in response to the second data file and the vibration modulating signal.

A further embodiment of the foregoing method, wherein the V/Q converter comprises: a transformer, including a primary winding and a secondary winding; and a capacitor, defining a capacitor input terminal and a capacitor output terminal; wherein: the transformer is configured to: receive the simulated composite vibration voltage signal at the primary winding; produce, by inductive coupling, an induced first and second composite vibration voltage signal at the secondary winding; and apply the induced first and second composite vibration voltage signal to the capacitor input terminal; and the capacitor is configured to: receive, at the capacitor input terminal, the induced first and second composite vibration voltage signal; and produce, by electrostatic coupling, the simulated composite vibration charge signal at the capacitor output terminal.

A further embodiment of the foregoing method, wherein the second waveform generator is synchronized with the first waveform generator by a method comprising: generating, by the first waveform generator, a synchronizing signal and a trigger signal; and inputting, from the first waveform generator to the second waveform generator, the synchronizing signal and the trigger signal.

A further embodiment of the foregoing method, wherein: the first speed is representative of an N2 speed; and the second speed is representative of an N1 speed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for generating input signals for an electronic engine control (EEC) module, the system comprising:
a first waveform generator that is configured to generate:
a simulated first speed signal that is representative of a first speed; and
a vibration modulating signal that is representative of the first speed;
a second waveform generator, synchronized with the first waveform generator, that is configured to receive the vibration modulating signal and to generate:
a simulated second speed signal that is representative of a second speed; and
a simulated composite vibration voltage signal; and
a voltage-to-charge (V/Q) converter that is configured to receive the simulated composite vibration voltage signal from the second waveform generator and to generate a simulated composite vibration charge signal that simulates a speed/vibration composite signal from an accelerometer,
wherein the V/Q converter comprises:
a transformer, including a primary winding and a secondary winding; and
a capacitor, defining a capacitor input terminal and a capacitor output terminal;
wherein:
the transformer is configured to:
receive the simulated composite vibration voltage signal at the primary winding;
produce, by inductive coupling, an induced first and second composite vibration voltage signal at the secondary winding; and
apply the induced first and second composite vibration voltage signal to the capacitor input terminal; and
the capacitor is configured to:
receive, at the capacitor input terminal, the induced first and second composite vibration voltage signal; and
produce, by electrostatic coupling, the simulated composite vibration charge signal at the capacitor output terminal.

2. The system of claim 1, wherein:
the first waveform generator comprises a first arbitrary waveform generator that is configured to:
read a first data file that is representative of a modeled first speed;
generate the simulated first speed signal in response to the first data file; and
generate the vibration modulating signal in response to the first data file; and
the second waveform generator comprises a second arbitrary waveform generator that is configured to:
read a second data file that is representative of a modeled second speed;
generate the simulated second signal in response to the second data file; and
generate the simulated composite vibration voltage signal in response to the second data file and the vibration modulating signal.

3. The system of claim 1, wherein the first waveform generator is further configured to:
produce a synchronizing signal and a trigger signal; and
input the synchronizing signal and the trigger signal to the second waveform generator, thereby synchronizing the second waveform generator with the first waveform generator.

4. The system of claim 1, wherein:
the first speed is representative of an N2 speed; and
the second speed is representative of an N1 speed.

5. The system of claim 1, wherein the transformer has a primary-to-secondary turns ratio between 1:10 and 10:1.

6. The system of claim 5, wherein the transformer has a primary-to-secondary turns ratio of about 1:1.

7. The system of claim 6, wherein the transformer is miniature or an ultra-miniature transformer.

8. The system of claim 1, wherein the capacitor has a capacitance between 1,000 and 20,000 pF.

9. The system of claim 8, wherein the capacitor comprises three parallel-connected temperature-compensating ceramic capacitors, each having a capacitance of about 1,000 pF.

10. The system of claim 2, wherein:
the first data file is a first comma-separated values (CSV) data file; and
the second data file is a second CSV file.

11. The system of claim 3, wherein the synchronizing signal is a 10 MHz synchronizing clock signal.

12. The system of claim 4, wherein the simulated N2 speed signal corresponds to a shaft rotational speed between 1-400 revolutions per second.

13. The system of claim 4, wherein the simulated N1 speed signal corresponds to a shaft rotational speed between 1-200 revolutions per second.

14. The system of claim 1, further comprising the EEC module, wherein the EEC module is configured to receive the simulated first speed signal, the simulated second speed signal, and the simulated composite vibration charge signal.

15. A method of generating input signals for an electronic engine control (EEC) module by using a first and second waveform generator and a voltage-to-charge (V/Q) converter, the method comprising:
generating, by the first waveform generator:
a simulated first speed signal that is representative of a first speed; and
a vibration modulating signal that is representative of the first speed;
inputting, from the first waveform generator to the second waveform generator, the vibration modulating signal;
generating, by the second waveform generator:
a simulated second signal that is representative of a second speed; and
a simulated composite vibration voltage signal that is representative of the second speed and the vibration modulating signal;
wherein the second waveform generator is synchronized with the first waveform generator; and
generating, by the V/Q converter, a simulated composite vibration charge signal that simulates a speed/vibration composite signal from an accelerometer, wherein the simulated composite vibration charge signal is representative of the simulated composite vibration voltage signal,
wherein the V/Q converter comprises:
a transformer, including a primary winding and a secondary winding; and
a capacitor, defining a capacitor input terminal and a capacitor output terminal;

wherein:
the transformer is configured to:
receive the simulated composite vibration voltage signal at the primary winding;
produce, by inductive coupling, an induced first and second composite vibration voltage signal at the secondary winding; and
apply the induced first and second composite vibration voltage signal to the capacitor input terminal; and
the capacitor is configured to:
receive, at the capacitor input terminal, the induced first and second composite vibration voltage signal; and
produce, by electrostatic coupling, the simulated composite vibration charge signal at the capacitor output terminal.

16. The method of claim 15, wherein:
the first waveform generator comprises a first arbitrary waveform generator that is configured to:
read a first data file that is representative of a modeled first speed;
generate the simulated first speed signal in response to the first data file; and
generate the vibration modulating signal in response to the first data file; and
the second waveform generator comprises a second arbitrary waveform generator that is configured to:
read a second data file that is representative of a modeled second speed;
generate the simulated second signal in response to the second data file; and
generate the simulated composite vibration voltage signal in response to the second data file and the vibration modulating signal.

17. The method of claim 15, wherein the second waveform generator is synchronized with the first waveform generator by a method comprising:
generating, by the first waveform generator, a synchronizing signal and a trigger signal; and
inputting, from the first waveform generator to the second waveform generator, the synchronizing signal and the trigger signal.

18. The method of claim 15, wherein:
the first speed is representative of an N2 speed; and
the second speed is representative of an N1 speed.

* * * * *